United States Patent

Noguchi et al.

[15] 3,667,322

[45] June 6, 1972

[54] OIL PRESSURE CONTROLLING DEVICE FOR AUTOMATIC TRANSMISSION WITH HYDRAULIC TORQUE CONVERTER

[72] Inventors: Masaaki Noguchi, Nagoya; Masaharu Sumiyoshi, Toyota; Shigeru Sakakibara, Aichi-Ken; Osamu Ito, Toyota; Takaaki Kato, Toyohashi, all of Japan

[73] Assignees: Toyota Jidosha Kogyo Kabushiki Kaisha, by said Noguchi, Sumiyoshi, and Sakakibara; Nippon Denso-Kabushiki Kaisha, ; by said Ito and Kato

[22] Filed: July 9, 1970

[21] Appl. No.: 53,364

[30] Foreign Application Priority Data

July 19, 1969 Japan....................................44/57145

[52] U.S. Cl.................................74/731, 74/752 A, 74/868
[51] Int. Cl...................F16h 47/06, F16h 5/42, B60k 23/00
[58] Field of Search............74/868, 869, 731, DIG. 1, 752 A, 74/752 C, 752 D; 192/109 F

[56] References Cited

UNITED STATES PATENTS

| | | | |
|---|---|---|---|
| 2,711,656 | 6/1955 | Smirl | 74/DIG. 1 |
| 2,756,851 | 7/1956 | Collins | 74/DIG. 1 |
| 3,019,668 | 2/1962 | Winchell et al. | 74/DIG. 1 |
| 3,293,935 | 12/1966 | Tuck et al. | 74/DIG. 1 |
| 3,330,170 | 7/1967 | Rains et al. | 74/DIG. 1 |
| 3,416,393 | 12/1968 | Hattori | 74/731 |

Primary Examiner—Carlton R. Croyle
Assistant Examiner—Thomas C. Perry
Attorney—Blum, Moscovitz, Friedman & Kaplan

[57] ABSTRACT

An oil pressure control system is provided in relation to an automatic transmission for vehicles composed of a hydraulic torque converter pump, a hydraulic torque converter turbine, a gear transmission unit incorporating gears and frictionally engaging means, and an oil pressure operating circuit for controlling the engagement and disengagement of the aforesaid frictionally engaging means, said circuit incorporating a constant pressure valve for maintaining the operation oil pressure in such circuit at a predetermined value, an electronically controlled actuator, and an actuating valve for changing the predetermined value of the constant pressure valve by energizing or de-energizing the actuator. A computer circuit is provided for controlling the activation of said actuator through the medium of delivery thereto of, respectively, a signal in accordance with the number of revolutions of the output shaft of the gear transmission and a signal in accordance with the number of revolutions of the hydraulic torque converter turbine shaft.

9 Claims, 5 Drawing Figures

3,667,322

OIL PRESSURE CONTROLLING DEVICE FOR AUTOMATIC TRANSMISSION WITH HYDRAULIC TORQUE CONVERTER

STATE OF THE ART

In conventional automatic transmissions, provided with hydraulic torque converters, the oil pressure for operating the frictionally engaging means of the gear transmission units thereof, hereinafter referred to as the operation oil pressure, is controlled by an oil pressure controlling valve including a front oil pump (PF) driven by the engine of the vehicle when the latter is cruising at low speed. Said oil, while under pressure, is directed from the front pump to the frictionally engaging means by an oil pressure controlling valve. When the speed of the cruising vehicle attains a speed above intermediate speed, operation oil supplied from a rear oil pump (PR), driven by the output shaft of the gear transmission, is added. Generally speaking, the operation oil pressure controlled by the oil pressure controlling valve is high by virtue of the high frictional torque attained in the frictionally engaging means when the vehicle is cruising at a speed lower than the predetermined value. When the vehicle speed attains a predetermined value the oil pressure is controlled through the use of a complicated and unsatisfactory controlling circuit for the purpose of attempting to lower the oil pressure. Hence, each time the shift lever is moved to start a vehicle after a temporary stop thereof, oil under high pressure is supplied to the frictionally engaging means, which imparts a shock to the vehicle, hereinafter referred to as shift shock. It has been found to be difficult to effectuate the prevention of shift shock by the conventional approach of correction of the oil pressure controlling circuit.

More particularly, at the time the shift lever is moved, and when the accelerator is abruptly depressed to initiate a starting movement, the rotation of the oil pump, connected to the output shaft of the engine, is increased together with the increase of the rotation of the engine shaft, and it is impossible to avoid high shift shock as the oil pressure from said oil pump is abruptly increased.

In general, it is desirable to supply low oil pressure to avoid shift shock in actuating the frictionally engaging means.

However, it is necessary for the frictionally engaging means to have high torque and therefore the frictionally engaging means are usually applied under high oil pressure when a vehicle starts. In present conventional transmissions, since it is difficult to establish a differential rate of oil under pressure for the purpose of distinguishing the status of standstill from starting, the oil pressure must be kept at a high value even at a standstill, which necessarily results in shift shock.

SUMMARY OF THE INVENTION

This invention relates to an oil pressure controlling device for vehicles provided with an automatic transmission incorporating among other elements a hydraulic torque converter for preventing shock in a vehicle when the shift lever is moved to start the vehicle after a temporary stop, such device being composed of a hydraulic torque converter, a gear transmission, frictionally engaging means contained in said transmission, and an oil pressure circuit for controlling the operations thereof, to carry out speed change by engaging or releasing the frictionally engaging means.

The inventors of the present invention have provided an automatic gear-shift device for gear transmissions, for shifting from a low speed range into a high speed range by means of electric signals, obtained by electrically detecting the rotation speed of the output shaft of the gear transmission and the rotation speed ratio of the hydraulic torque converter pump and hydraulic torque converter turbine. The automatic gear-shift device has made it possible to obtain signals indicating vehicle conditions of standstill and starting. Consequently, it has been made possible to solve the above-mentioned problem by preventing the generation of shift shock, by energizing and deenergizing and actuating in the nature of an electronically controlled element such as a solenoid as by delivering signals to said actuator in accordance with the calculation of an oil operation computer circuit of the number of revolutions of the gear transmission, and the number of revolutions of the hydraulic torque converter turbine shaft.

DESCRIPTION OF THE PREFERRED EMBODIMENTS

Figure 1:
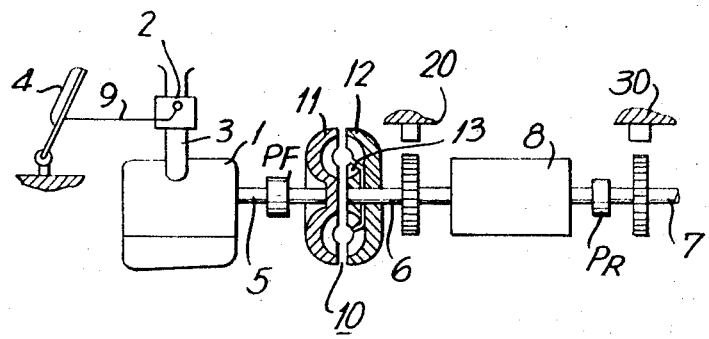
FIG. 1 is a schematic side view showing the outline of the automatic transmission with hydraulic torque converter.

In the structure of the automatic transmission of FIG. 1, the output of the engine 1 is applied to the output shaft 5 on which is mounted the front oil pump $P_F$. A hydraulic torque converter 10, composed of a hydraulic torque converter pump 11, torque converter turbine 12, and stator 13, is disposed between the output shaft 5 of the engine and hydraulic torque converter turbine shaft 6, the output of engine being transferred to the hydraulic torque converter turbine shaft 6 through the fluid within the hydraulic torque converter.

The multiple stage gear transmission 8, illustrated in copending application, Ser. No. 855,510, assigned to the same assignees, is composed of gears and frictionally engaging means (not shown), the speed change of respective gears being carried out by the engagement or disengagement of the frictionally engaging means. Gear transmission 8 transmits torque from shaft 6 to the load through output shaft 7.

Throttle valve 2 is provided on the intake manifold 3 of the engine, and the output increase and decrease in of the engine 1 is controlled by said valve 2, which is connected to the acceleration pedal by means of link 9.

The above-mentioned members are the same as in the case of conventional automatic transmission with hydraulic torque converter, and therefore further detailed explanation thereof is omitted here.

Figure 2:
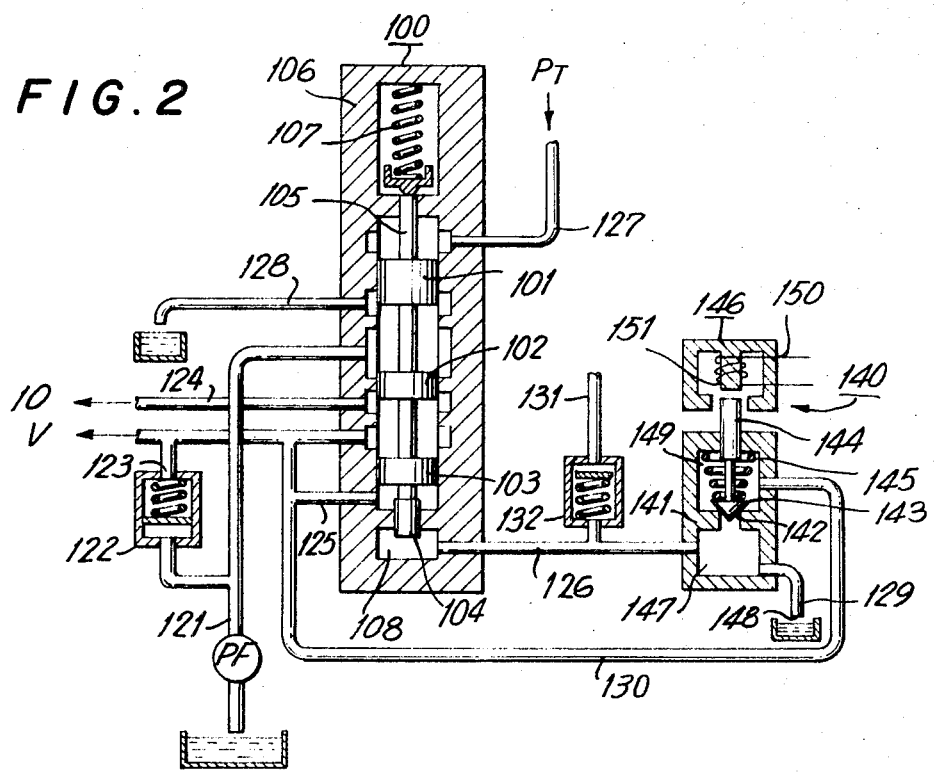
FIG. 2 is a constructive diagram showing the structure of oil pressure controlling circuit.

The structure of oil pressure controlling circuits is graphically indicated in FIG. 2. The above-mentioned oil pressure controlling circuit is composed of the constant pressure valve 100 and actuating valve 140 and the paths 126, 130 for connecting said valves.

The hydraulic torque converter 10 of the multiple stage automatic transmission with hydraulic torque converter and the frictionally engaging means of the multiple stage gear transmission 8, as illustrated in the aforementioned application, are operated through the pressurized oil of the oil pressure operation circuits (not shown).

The pressurized oil of said oil pressure operation circuits is supplied by means of the front oil pump $P_F$ of a gear pump type connected to the output shaft 5 of the engine.

However, the change of oil pressure of the pressurized oil generated by the above-mentioned front oil pump $P_F$ is great and therefore the oil pressure of the pressurized oil is controlled to be a predetermined value by using the constant pressure valve.

FIG. 2 shows the controlling circuit, including the constant pressure valve 100 used in the conventional multiple stage automatic transmission with hydraulic torque converter, said constant pressure valve 100 being composed of the valve body 106 containing a valve rod 105 having four valves 101, 102, 103 and 104 and the spring 107 provided on the upper portion of the valve rod 105. The operation oil supplied by the front oil pump $P_F$ is delivered to the pressure chamber between the valves 101 and 102 from the oil path 121, and at the same time oil is supplied to the oil path 123 connected to the oil pressure operation circuit inclusive of hand valve V (not shown)

through the check valves 122, and on the other hand, the operation oil of almost the same pressure as that of the oil path 123 is supplied to the hydraulic torque converter 10 through the oil path 124 through the valve 102 and the valve body 106 from the pressure chamber between the valves 101 and 102.

The operation oil in the oil path 123 is supplied into the pressure chamber below the valve 103, through the oil path 125, and generates power to raise the valve rod 105, but since the spring 107 is provided in the upper portion of the valve rod 105 between the same and the internal wall of the valve body 106, the valve rod 105 stops at the position where the pressure is balanced, so that the operation oil pressure to be supplied into the oil path 123 is controlled to be a predetermined value.

The operation oil pressure controlled by the hand valve V (not shown) is supplied to the pressure chamber 108, below the valve 104, when the vehicle moves forwardly, and the valve rod 105 is displaced upwardly more than the balanced state by the operation oil pressure thereby lowering the oil pressure from the oil path 123, the oil pressure $P_T$ modulated by the governor pressure and throttle pressure being supplied into the pressure chamber above the valve 101 from the oil path 127 for displacing the valve rod 105 downwardly, to increase the oil pressure being fed from the oil path 123.

The oil path 128 is the outlet oil path into the oil tank.

When the above-mentioned constant pressure valve 100 is used and the hand valve V (not shown) is in any of the positions of neutral, parking or reverse, no oil pressure is supplied to the pressure chamber 108 at the lower end of the valve rod 105 and therefore the operation oil pressure from the oil path 123 is at high pressure. When the acceleration pedal 4 is abruptly depressed along with the shifting of the hand valve V into the forward position, high pressure oil in the oil path 123 flows into the frictionally engaging means of the transmission, and the generated oil pressure of the front oil pump $P_F$ is increased, and therefore the generation of the shift shock cannot be avoided.

However, in accordance with the present invention, the generation of shift shock can be prevented by connecting the oil path 126, connected to the above-mentioned pressure chamber 108, to actuating valve 140. At the same time the rotation speed of the output shaft of the transmission and the rotation speed of the hydraulic torque converter turbine shaft are electronically detected, and when these factors are in a predetermined condition, actuating valve 140 is operated to supply the operation oil of the oil path 123 into the above-mentioned pressure chamber 108 to raise the valve rod 105, whereby to maintain at "low" the operation oil pressure of said operation oil.

As illustrated in FIG. 2, the actuating valve 140 is composed of valve body 141, the valve rod 144 having the valve 143 to be mounted on the valve seat 142 of the above-mentioned valve body 141, a spring 145 between the valve rod 144 and the valve body 141 so that said valve rod 144 can be seated on the valve seat 142, and the solenoid 146 for separating the valve 143 from the valve seat 142 by pulling the above-mentioned valve rod 144 against the spring force of the spring 145.

The oil path 126 connected to the pressure chamber 108 of said constant pressure valve 100 is connected to the pressure chamber 147 formed below the valve seat 142 within the valve box 141 of said actuating valve 140, and said pressure chamber 147 is connected to said outlet oil path 129 through the orifice 148.

On the other hand, the oil path 130 branched from said oil path 123 is connected to the pressure chamber 149 formed above the valve seat 142 within the valve box 141 of the actuating valve 140.

The solenoid 146 is composed of the solenoid core 150 and the coil 151 wound on said core, and said coil 151 attracts the valve rod 144 upwards when conductive, and when conduction is terminated, the valve rod 144 is pushed down by the expansion of the spring 145.

When the valve rod 144 is attracted upwards, the pressurized oil from the oil path 130 is connected to the oil path 126 through the valve seat 142 and at the same time it is drained from the oil path 129.

However, the orifice 148 which is the mouth of the oil path 129 is small, and sufficient pressurized oil will be charged into the oil path 126 and supplied into the pressure chamber 108.

When the valve rod 144 is depressed, the valve 143 is seated on the valve seat 142, and the path of the pressurized oil from the oil path 130 to the chamber 147 is closed.

The pressurized oil remaining in the oil path 126 is partially released through the oil path 129, and therefore the oil pressure is lowered.

The pressurized oil conducted into the oil path 126 from the actuating valve 140 enters into the pressure chamber 108 of the constant pressure valve 100, and raises the valve rod 105 thereof.

Therefore, the pressurized oil introduced into the pressure chamber 108 works as if the spring 107 were provided with a smaller depressing force, and the operating oil pressure of the oil pressure operation circuit generated in the oil paths 123, 124 is thus lowered.

Thus, the operating oil pressure of the oil pressure operation circuit is lowered by energizing the solenoid 146 of the actuating valve 140 and the operating oil pressure can be brought back to the original oil pressure by de-energizing the solenoid 146.

The valve 143 of the actuating valve 140 is shown as a needle valve in the above-given embodiment, but it is not restricted to the needle valve.

In other words, such a valve that can send the pressurized oil of the oil path 130 by means of the solenoid 146 to the oil path 126, and can perform the function of releasing the pressurized oil of the oil path 126, by a tridirectional switch valve, can be utilized without departing from the spirit of the present invention.

As described so far in the foregoing paragraphs, in the constant pressure valve 100 to be used for the conventional multiple stage automatic transmission with hydraulic torque converter, the operation oil is supplied into the pressure chamber 108 to keep oil pressure low while the gear transmission is in the second or top gear position. When forward cruising is done wherein the hand valve V is shifted into drive $D_1$ range of drive $D_2$ range, the oil path 131 controlled by the hand valve V can be connected to the oil path 126 through the check valve 132.

Said check valve 132 can displace the operation oil into the oil path 126 from the oil path 131, and is a monodirectional valve which shuts out the operation oil from the oil path 126 to the oil path 131, so that when the solenoid 146 of the actuating valve 140 is energized and the operation oil under pressure from the oil path 130 is connected to the oil path 126, the check valve 132 is closed, and the operation oil under pressure is therefore not delivered into the oil path 131. On the other hand, when the solenoid 146 is de-energized and at the same time the operation oil under pressure is delivered into the oil path 131, the check valve 132 is opened, and operation oil under pressure is supplied into the oil path 126 and the pressure chamber 108 to push up the valve rod 105.

In the present invention, when the transmission 8 is composed of a planetary gear, the oil path 131 is preferably branched from the feeding oil path for the front servo mechanism.

Figure 3:
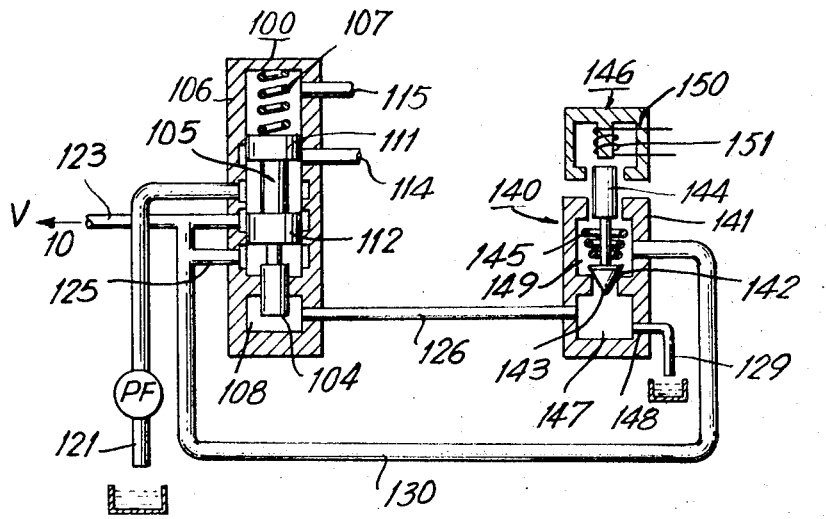
FIG. 3 is a constructive diagram showing a modified embodiment of an oil pressure controlling valve.

The embodiment shown in FIG. 3, shows the operation oil pressure controlling circuit to be used in the device for automatically carrying out the speed change by means of an electric signal determined by the rotation speed ratio of the hydraulic torque converter turbine and the hydraulic torque converter pump, and the rotation speed of the output shaft of the gear transmission, same portions of the present embodiment as those of the embodiment of FIG. 2 are shown with the same notations.

The constant pressure valve 100 is composed of the valve body 106 containing the valve rod 105 having the three valves 111, 112 and 104 and the spring 107 provided between the top portion of the valve rod and the valve body 106, and the operation oil under pressure from the front oil pump $P_F$ of gear pump type driven by the engine is supplied into the pressure chamber between the valves 111, 112 by the oil path 121, and the operation oil under pressure from the oil path 123 is delivered to hydraulic torque converter 10 and the frictionally engaging means within the transmission 8 as is shown in FIG. 1 through the hand valve V (not shown).

On the other hand, the pressurized oil in the oil path 123 is supplied into the pressure chamber below the valve 112 through the oil path 125 to push up the valve rod 105 and the push up force thereof controls the operation oil pressure in the oil path 123 to a predetermined value in balance with the spring force of the spring 107.

The oil path 130 branched from the oil path 123 is connected to the pressure chamber 149 of the actuating valve 140, and the pressure chamber 108 below the valve 104 of the constant pressure valve 100 is connected to the pressure chamber 147 of the actuating valve 140.

114 and 115 are the drain paths connected to the oil tank (not shown) of the operating oil.

In this embodiment, the engaging and disengaging of the frictional engaging means of the transmission 8 is carried out in respect to an electric signal obtained under the predetermined conditions by introducing the electric signals showing the rotation speed of the output shaft 7 of the gear transmission 8, the electric signal showing the rotation speed ratio of hydraulic torque converter pump 11 and the hydraulic torque converter turbine 12 and the gearing position signal of said transmission into the computer circuit (not shown). In this embodiment, the constant pressure valve 100 and the operation oil pressure controlling circuit can be simply constructed, as is shown in the diagrams.

In this embodiment, when the solenoid 146 is energized, pressurized oil from the oil path 123 is introduced into the pressure chamber 108 to lower the operation oil pressure of the oil pressure operating circuit, and by de-energizing the solenoid, the operation oil pressure returns to the original oil pressure value, in the same manner as in FIG. 2.

In the present invention, the signal for energizing or de-energizing the solenoid 146 of the actuating valve 140 is determined by the rotation speed of the input shaft 6 and the output shaft 7 of the transmission 8.

In other words, as mentioned above, shift shock is generated when the shift lever is shifted from the parking position (Position P or the neutral position (Position N), into the reverse position (Position R), the drive position (Position $D_1$), the drive 2 position (Position $D_2$), or low gear position (Position L).

When a shift lever is on Position P or Position N, the operation oil pressure is not supplied to the frictionally engaging means of the transmission 8, and therefore the hydraulic torque converter turbine shaft 6 can be freely rotated.

The above-mentioned frictionally engaging means can be engaged by means of operation oil pressure on Positions R, $D_1$, $D_2$, and L, and the hydraulic torque converter turbine shaft 6 can rotate at the determined speed in connection with the rotation of the output shaft 7 of the transmission 8 and the speed reducing ratio of the gears.

Therefore, when the output shaft 7 of the transmission is not rotated, the hydraulic torque converter turbine shaft 6 is not rotated.

The starter switch can be turned on to start the engine only in Position P or N.

In other words, when the vehicle stops and the engine is rotated at the Position P or N, the number of revolutions of the output shaft 7 of the transmission 8 is $N_3 = 0$ rpm and the number of revolutions of hydraulic torque converter turbine shaft 6 is $N_2 > 20$ rpm.

Thereafter, when the shift lever is moved to the positions such as R, $D_1$, $D_2$, or L, until the frictionally engaging means is engaged, the above condition is effected. However, when the engagement is finished, the number of revolutions of the output shaft 7 of the transmission remains $N_3 < 20$ rpm, and the number of revolutions of the hydraulic torque converter turbine shaft 6 becomes $N_2 < 20$ rpm, and generally speaking, when the frictionally engaging means is engaged, shift shock is generated.

In order to prevent the shift shock, the operation oil pressure is required to be kept lower until the engagement is terminated.

In this case, when the shift lever is moved in the state where the acceleration pedal 4 is depressed, severe shift shock is generated in most cases.

Generally, therefore, the foot is separated from the acceleration pedal 4 to move the shift lever.

However, it is desirable to keep the operation oil pressure low until the engagement of the frictionally engaging means is terminated regardless of whether or not the acceleration pedal 4 is depressed.

It is desirable to keep the following conditions:

| Number of Revolutions of the Output Shaft 7 of Transmission | Number of Revolutions of Hydraulic Torque Converter Turbine Shaft 6 | Operating Oil Pressure |
|---|---|---|
| $N_3 < 20$ rpm | $N_2 > 20$ rpm | Low Pressure |

In order to satisfy the above-mentioned conditions for preventing shift shock, the operation oil pressure should be kept low only when the number of revolutions of the output shaft 7 of the transmission is $N_3 < 20$ rpm, and the number of revolutions of the hydraulic torque converter turbine shaft 6 is $N_2 > 20$ rpm. Under any other conditions the operation oil pressure must be kept high.

In order to satisfy the above-mentioned conditions, in accordance with the present invention, a computer circuit, having detector 30 for detecting the number of revolutions for generating corresponding electric signal in accordance with the number of revolutions of the output shaft 7 of the transmission, and a detector 20 for detecting the number of revolutions for generating a corresponding electric signals, in accordance with the number of revolutions of the hydraulic torque converter turbine shaft 6, is used.

Figure 4:
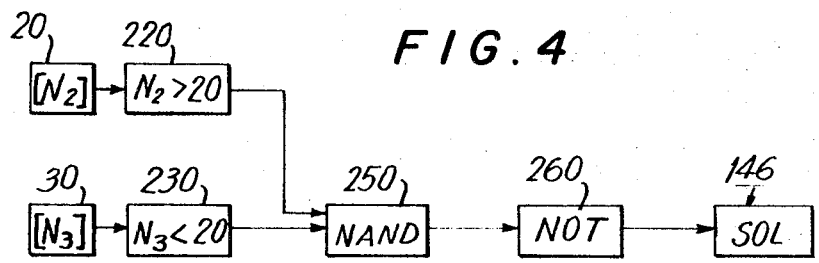
FIG. 4 is a block diagram of a computer circuit.

The computer circuit, as shown in FIG. 4, is composed of detectors 20, 30 for detecting the number of revolutions, comparison circuits 220, 230, NAND- circuit 250, NOT-circuit 260 and the solenoid 146.

Figure 5:
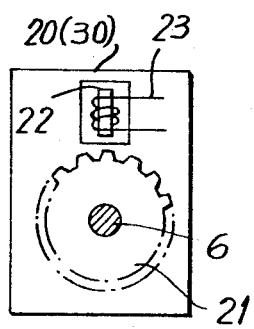
FIG. 5 is a constructive diagram showing the structure of the detector for detecting the number of revolutions.

The detector 20 for detecting the number of revolutions, as shown in FIG. 5, is such that the toothed disc 21, provided on the hydraulic torque converter turbine shaft 6, is rotated, and the teeth provided on the outer periphery of said disc 21 alternately approach and separate from magnet 22 to change the magnetic leakage flux from the magnet 22, and the change of the magnetic leakage flux generates signals in the coil 23 wound on the magnet 22, the value of said signals being in proportion to the number of revolutions of the hydraulic torque converter turbine shaft 6.

The detector 30 for detecting the number of revolutions of output shaft 7 is constructed and operates in a manner similar to those of the above-mentioned detector 20, a toothed disc having a magnet mounted adjacent thereto being fixed on the output shaft 7 of the transmission for generating signals (pulse voltage) in accordance with the number of revolutions of the output shaft 7 of the transmission.

The detectors 20, 30 for detecting the number of revolutions are not restricted to those given in FIG. 5, but those which can generate signals (pulse voltage) in accordance with the number of revolutions, or those which can generate the signals (DC voltage) in proportion to the number of revolutions can also be used.

The comparison circuit 220 for determining the number of revolutions receives the pulse voltage from the detector 20 as its input, and generates predetermined output signals when the number of revolutions of the hydraulic torque converter turbine shaft 6 is above a predetermined number of revolutions, no such output signal being generated when the number of revolutions becomes less than said predetermined number of revolutions.

The above-mentioned circuit 220, for example, is composed of an amplifier circuit for amplifying input pulse voltage, an amplitude restrictor circuit for the output of the above-mentioned amplifier circuit, a frequency-DC voltage converter circuit for the output of the above-mentioned amplitude restrictor circuit, and a comparator amplifier circuit for comparing the output voltage of said frequency-DC voltage converter circuit to the standard voltage.

When the standard voltage of the above-mentioned comparator amplifier circuit is appropriately set, it is possible to determine the number of revolutions at which the output signal of the above-mentioned circuit 220 is produced.

When the number of revolutions of the torque converter turbine shaft 6 is selected to be $N_2$, it is possible to determine the standard voltage of the comparator amplifier circuit in such a manner that the output signal of the circuit 220 is generated when $N_2$ becomes more than 20 rpm (this is available from 0 to 100 rpm).

The circuit 230 for determining the number of revolutions has the same structure as that of the above-mentioned circuit 220, an output signal being generated when the number of revolutions $N_3$ of the output shaft 7 of the transmission is below 20 rpm, said output signal not being generated when said number of revolutions goes above 20 rpm (available from 0 to 50 rpm).

The number of revolutions for the above-mentioned output signal can be determined as a matter of choice, but it is preferable to determine the speed of the hydraulic torque converter to be as low as possible.

The NAND-circuit 250 is used as a logic NOT-product circuit, and when all the input signals applied thereto are present, a signal of predetermined value of the output terminal is eliminated. The NOT-circuit 260 (which may be a conventional amplifier circuit) does not generate an output signal when an input signal is present, and generates the output signal only when an input signal is not present.

As described above, the operation oil pressure is kept low only when the number of revolutions of the output shaft 7 of the transmission is $N_3 < 20$ rpm, and the number of revolutions of the hydraulic torque converter turbine shaft 6 is $N_2 > 20$ rpm, and it is kept high in all other conditions. To satisfy these conditions, the computer circuit, as shown in FIG. 4, provides for elimination of an output on NAND-circuit 250, only when the output signals of the circuits 220 and 230 for determining the number of revolutions are present. The output signal (predetermined positive voltage) of the above-mentioned NAND-circuit 250 is not supplied to the NOT-circuit 260, and the solenoid 146 is rendered conductive by the signal of said NOT-circuit, and thereby the operating oil pressure is lowered.

When any one of the above-mentioned two conditions is not present, the output signal of the NAND-circuit 250 is generated, and the output signal of NOT-circuit 260 is eliminated, and therefore the operation oil pressure is raised.

In the above-mentioned embodiment, the solenoid 146 is used for driving the valve 143 of the actuator 140, but other electric actuators such as a motor can also be used.

Furthermore, the combination circuit of NAND-circuit and NOT-circuit is the same as an AND-circuit, and the latter can take the place of the former two as combined.

Any logic circuit producing the same results as the circuit of FIG. 4 can be substituted therefor without departing from the spirit of the present invention.

As described in the foregoing paragraphs, in accordance with the present invention, when the number of revolutions of the output shaft of the transmission is below a predetermined value, and the number of revolutions of the hydraulic torque converter turbine shaft is above a predetermined value, the operation oil pressure is controlled to be lower, and therefore it is possible to keep the operation oil pressure at a low level until the frictionally engaging means terminates the engagement after the movement of the shift lever, to the end that shift shock is prevented and quick start is realized.

What is claimed is:

1. An operation oil pressure controlling device for preventing shift shock upon movement of the shift lever of the transmission in an automotive vehicle wherein said automatic transmission incorporates a hydraulic torque converter pump, a hydraulic torque converter turbine operatively coupled to said hydraulic torque converter pump, a gear transmission including gears and frictionally engaging means, a first output shaft leading from said turbine to said gear transmission, a second output shaft leading from said gear transmission, and an oil pressure operating circuit for controlling the engagement and disengagement of said frictionally engaging means; said operation oil pressure controlling device comprising a constant pressure valve for maintaining the oil pressure of said oil pressure operating circuit at a predetermined value, an actuator, a control valve operatively coupled to said constant pressure valve for lowering the predetermined value of the oil pressure developed by the constant pressure valve upon activation of said actuator, speed responsive signal generator means operatively coupled to each of said first and second output shafts, and means for operating said actuator in response to said speed responsive signals in accordance with the speed of said first and second output shafts, whereby upon activation of said actuator, the operation oil pressure applied to the frictionally engaging means is lowered.

2. An operation oil pressure controlling device, in accordance with claim 1, wherein the actuator is electrically activated and wherein electrically controlled means are provided for activating said actuator in response to said speed responsive signals.

3. An operation oil pressure controlling device, in accordance with claim 2, wherein the actuator is a solenoid.

4. An operation oil pressure controlling device, in accordance with claim 2, wherein the means for activating said actuator comprises a computer for transmitting to the actuator electronic signals in accordance respectively with the number of revolutions of said second output shaft of the gear transmission and the number of revolutions of said first output shaft of the hydraulic torque converter turbine.

5. An operation oil pressure controlling device, in accordance with claim 3, wherein the means for activating said actuator energizes said actuator by transmission of electrical signals to said solenoid in accordance with the number of revolutions of said second output shaft of the gear transmission and the number of revolutions of said first output shaft of the hydraulic torque converter turbine.

6. An operation oil pressure controlling device, in accordance with claim 1, wherein the actuator is activated and de-activated by the operating means therefor, and whereby upon de-activation of said actuator the operation oil pressure applied to the frictionally engaging means rises back to said predetermined value.

7. An operation oil pressure controlling device, in accordance with claim 1, wherein said operating means is adapted to activate said actuator in response to speed responsive signals representative of both the speed of said first output shaft being of a value greater than a second predetermined value lying in the range from 0 to 100 rpm and the speed of said second output shaft being of a value less than a second predetermined value lying in the range between 0 and 50 rpm.

8. An operation oil pressure controlling device, in accordance with claim 7, wherein said first predetermined value is about 20 rpm.

9. An operation oil pressure controlling device, in accordance with claim 7, wherein said second predetermined value is about 20 rpm.

* * * * *